(12) United States Patent
Lomax et al.

(10) Patent No.: US 10,431,791 B2
(45) Date of Patent: Oct. 1, 2019

(54) TRACTION BATTERY PACK SHIELD AND SHIELDING METHOD

(71) Applicant: Ford Global Technologies, LLC, Dearborn, MI (US)

(72) Inventors: Olivia Lomax, Southfield, MI (US); Patrick Daniel Maguire, Ann Arbor, MI (US); Stephen Liptak, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 15/340,929

(22) Filed: Nov. 1, 2016

(65) Prior Publication Data

US 2018/0123102 A1 May 3, 2018

(51) Int. Cl.
*B60K 1/04* (2019.01)
*H01M 2/10* (2006.01)

(52) U.S. Cl.
CPC ............ *H01M 2/1094* (2013.01); *B60K 1/04* (2013.01); *H01M 2/1077* (2013.01); *B60K 2001/0438* (2013.01); *B60Y 2306/01* (2013.01); *H01M 2220/20* (2013.01)

(58) Field of Classification Search
CPC ............. B60R 16/04; B60K 2001/04; B60K 2001/0438
USPC ........................................................ 180/68.5
See application file for complete search history.

(56) References Cited

U.S. PATENT DOCUMENTS

| | | | | |
|---|---|---|---|---|
| 5,193,635 A | * | 3/1993 | Mizuno | B60K 1/04 180/65.25 |
| 5,392,873 A | * | 2/1995 | Masuyama | B60R 16/04 180/68.5 |
| 5,985,482 A | | 11/1999 | Horton et al. | |
| 6,224,998 B1 | * | 5/2001 | Brouns | B60R 16/04 429/100 |
| 6,227,322 B1 | * | 5/2001 | Nishikawa | B60R 16/04 180/65.1 |
| 6,276,044 B1 | * | 8/2001 | Ragland | B21D 13/00 29/521 |
| 6,593,027 B1 | | 7/2003 | Osterhart et al. | |
| 7,614,469 B2 | * | 11/2009 | Kumar | H01M 2/1077 180/68.5 |
| 9,623,742 B2 | * | 4/2017 | Ikeda | B60K 1/04 |
| 9,758,029 B2 | * | 9/2017 | Hokazono | B60K 1/04 |
| 9,873,456 B2 | * | 1/2018 | Hara | B60K 1/04 |
| 2009/0186266 A1 | * | 7/2009 | Nishino | B60K 1/04 429/120 |
| 2009/0242299 A1 | * | 10/2009 | Takasaki | B60K 1/04 180/68.5 |

(Continued)

FOREIGN PATENT DOCUMENTS

CN 203026620 6/2013

*Primary Examiner* — Jeffrey J Restifo
(74) *Attorney, Agent, or Firm* — Carlson, Gaskey & Olds, P.C.

(57) ABSTRACT

An exemplary battery assembly includes a shield having a floor and walls extending transversely away from the floor. The shield provides a cavity configured to receive a battery pack of an electrified vehicle. The cavity is larger than the traction battery pack so that there is a gap between at least some of the walls and the traction battery pack within the cavity. An exemplary shielding method includes securing a shield to a vehicle frame to enclose a traction battery pack held within a cavity of the shield.

13 Claims, 4 Drawing Sheets

(56) References Cited

U.S. PATENT DOCUMENTS

| | | | | |
|---|---|---|---|---|
| 2010/0273040 A1* | 10/2010 | Kubota | B60K 1/04 | 429/100 |
| 2011/0143179 A1* | 6/2011 | Nakamori | B60K 1/04 | 429/99 |
| 2012/0100414 A1 | 4/2012 | Sonta | | |
| 2012/0115000 A1* | 5/2012 | Hashimura | B60K 1/04 | 429/100 |
| 2012/0156539 A1 | 6/2012 | Honjo et al. | | |
| 2013/0026786 A1* | 1/2013 | Saeki | B60K 1/04 | 296/187.12 |
| 2013/0045398 A1* | 2/2013 | Katano | B60K 1/04 | 429/7 |
| 2013/0075173 A1* | 3/2013 | Kato | B60K 1/04 | 180/68.5 |
| 2013/0118824 A1* | 5/2013 | Maeda | B62D 21/157 | 180/68.5 |
| 2013/0127200 A1* | 5/2013 | Saeki | B60K 1/04 | 296/37.14 |
| 2013/0187371 A1* | 7/2013 | Mauduit | B60K 1/04 | 280/781 |
| 2013/0229030 A1* | 9/2013 | Yamaguchi | B60K 1/04 | 296/193.07 |
| 2014/0262573 A1* | 9/2014 | Ito | B60K 1/04 | 180/68.5 |
| 2014/0284125 A1* | 9/2014 | Katayama | B60K 1/04 | 180/68.5 |
| 2014/0291046 A1* | 10/2014 | Araki | B60K 1/04 | 180/68.5 |
| 2014/0338999 A1* | 11/2014 | Fujii | B60K 1/04 | 180/68.5 |
| 2015/0174996 A1* | 6/2015 | Ikeda | B60K 1/04 | 180/68.5 |
| 2015/0249240 A1* | 9/2015 | Hihara | B60K 1/04 | 180/68.5 |
| 2015/0318525 A1* | 11/2015 | Maguire | H01M 2/1083 | 429/96 |
| 2016/0068195 A1* | 3/2016 | Hentrich | B60K 1/04 | 180/68.5 |
| 2016/0114667 A1* | 4/2016 | Ikeda | B60K 1/04 | 180/68.5 |
| 2016/0114699 A1* | 4/2016 | Hokazono | B60L 11/1877 | 180/68.5 |
| 2016/0218335 A1* | 7/2016 | Baek | H01M 2/1094 | |
| 2016/0236713 A1* | 8/2016 | Sakaguchi | B60K 1/04 | |
| 2016/0311301 A1* | 10/2016 | Ikeda | B60K 1/04 | |
| 2016/0339774 A1* | 11/2016 | Hayashi | B60K 1/00 | |
| 2017/0087972 A1* | 3/2017 | Hara | B62D 25/2027 | |
| 2017/0150657 A1* | 5/2017 | Seo | H05K 9/0026 | |

* cited by examiner

TRACTION BATTERY PACK SHIELD AND SHIELDING METHOD

TECHNICAL FIELD

A traction battery pack of an electrified vehicle can include an enclosure holding battery cells. This disclosure is directed toward a shield for such a battery pack. The shield is separate from the enclosure.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The battery pack is a relatively high-voltage battery pack that selectively powers the electric machines and other electrical loads of the electrified vehicle. The battery pack includes a plurality of interconnected battery cells that store energy for powering these electrical loads. The battery cells are held within an enclosure. Some enclosures are polymer-based and are thus more sensitive to high thermal energy levels than other types of enclosures.

SUMMARY

A battery assembly according to an exemplary aspect of the present disclosure includes, among other things, a shield having a floor and walls extending transversely away from the floor. The shield provides a cavity configured to receive a battery pack of an electrified vehicle. The cavity is larger than the traction battery pack so that there is a gap between at least some of the plurality of the walls and the traction battery pack within the cavity.

A further non-limiting embodiment of the foregoing assembly includes a cover of the shield that is attached to at least one of the walls and is moveable to a position that covers the cavity.

A further non-limiting embodiment of any of the foregoing assemblies includes a living hinge attaching the cover to one of the walls.

A further non-limiting embodiment of any of the foregoing assemblies includes a vehicle frame. The shield is secured directly to the vehicle frame.

A further non-limiting embodiment of any of the foregoing assemblies includes a vehicle frame. The shield is electrically grounded to the vehicle frame.

A further non-limiting embodiment of any of the foregoing assemblies includes an isolator of the shield that isolates loads from the vehicle frame.

In a further non-limiting embodiment of any of the foregoing assemblies, the isolator is a corrugated portion of the shield.

In a further non-limiting embodiment of any of the foregoing assemblies, the shield is secured to the vehicle frame through the isolator.

A further non-limiting embodiment of any of the foregoing assemblies, includes the battery pack having a polymer-based enclosure. The battery pack is supported on the floor of the shield when the battery pack is positioned within the cavity.

In a further non-limiting embodiment of any of the foregoing assemblies, the shield includes an aluminum material, and the shield provides thermal energy and electromagnetic shielding for the battery pack.

A battery pack shielding method according to an exemplary aspect of the present disclosure includes, among other things, securing a shield to a vehicle frame to enclose a traction battery pack held within a cavity of the shield.

A further non-limiting embodiment of the foregoing method includes grounding the shield to the vehicle frame.

A further non-limiting embodiment of any of the foregoing methods includes isolating loads on the battery pack using an isolator of the shield.

In a further non-limiting embodiment of any of the foregoing methods, the isolator includes a corrugated portion of the shield.

A further non-limiting embodiment of any of the foregoing methods includes crimping a portion of the shield to provide the corrugated portion.

In a further non-limiting embodiment of any of the foregoing methods, the battery pack includes a polymer-based enclosure, and the shield includes a metal or metal alloy providing thermal and electromagnetic shielding.

A further non-limiting embodiment of any of the foregoing methods includes covering the battery pack with a cover of the shield that is separate from the vehicle frame.

A further non-limiting embodiment of any of the foregoing methods includes securing the cover to the remaining portions of the shield using a living hinge.

A further non-limiting embodiment of any of the foregoing methods includes pressing a floor of the shield against the battery pack to compress the battery pack during the securing.

In a further non-limiting embodiment of any of the foregoing methods, the shield includes a floor and walls extending transversely away from the floor. The battery pack is held in the cavity such that the battery pack is spaced a distance from the walls to provide a gap between some of walls and the shield.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A battery pack can include an enclosure that hold battery cells. The enclosure can have seams where, for example, a tray of the enclosure is secured to a cover. Electromagnetic radiation can pass through the seams more easily than through other areas of the enclosure. This disclosure is directed toward a shield that is separate from the enclosure. The shield can block incoming or outgoing emissions of electromagnetic frequencies.

Some enclosures, especially those that are polymer-based, can be sensitive to high levels of thermal energy. That is, the polymer-based enclosure may degrade in response to high-temperatures more quickly than an enclosure that is not polymer-based. The shield of this disclosure additionally provides thermal energy protection for the battery pack.

Figure 1:
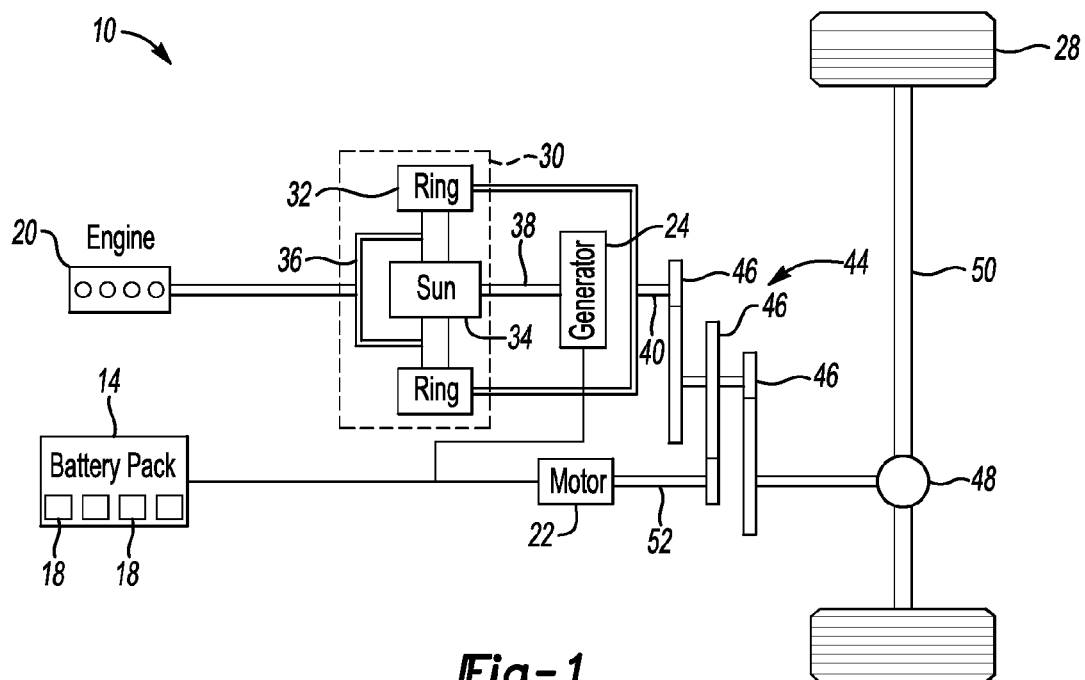
FIG. 1 schematically illustrates an example powertrain for an electric vehicle.
Figure 2:
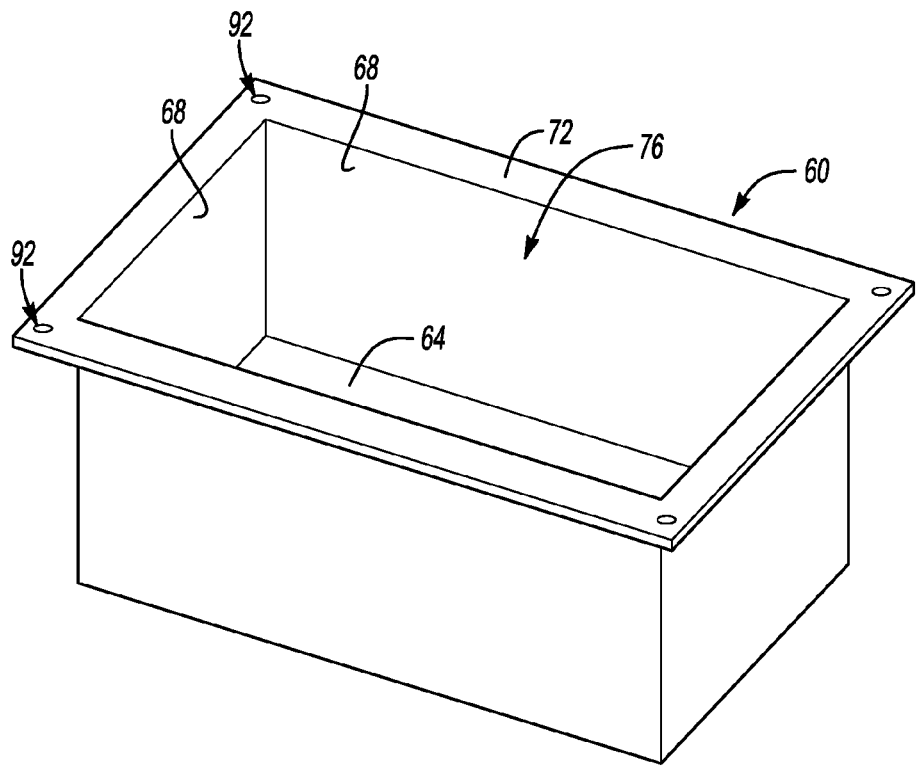
FIG. 2 illustrates a perspective view of a shield for a battery pack of the powertrain according to a first exemplary embodiment of this disclosure.
Figure 3:
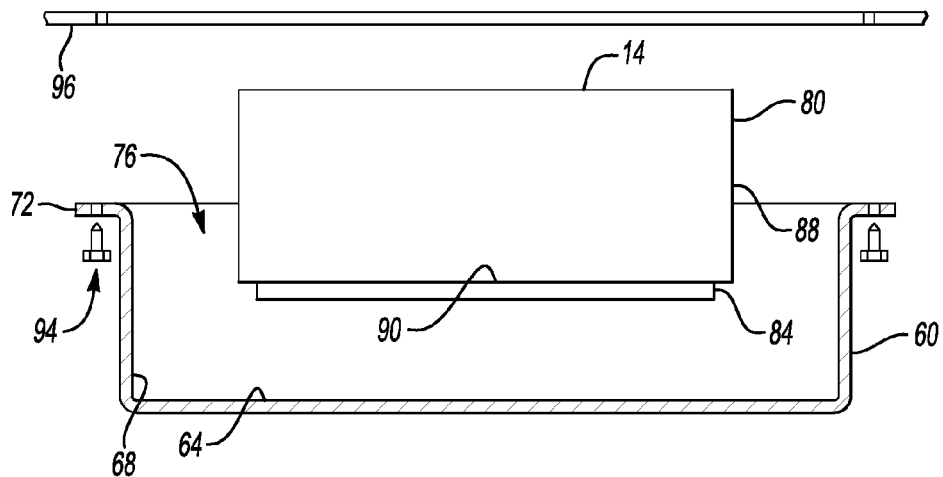
FIG. 3 illustrates a section view of the shield of FIG. 2 near the battery pack and a vehicle frame.
Figure 4:
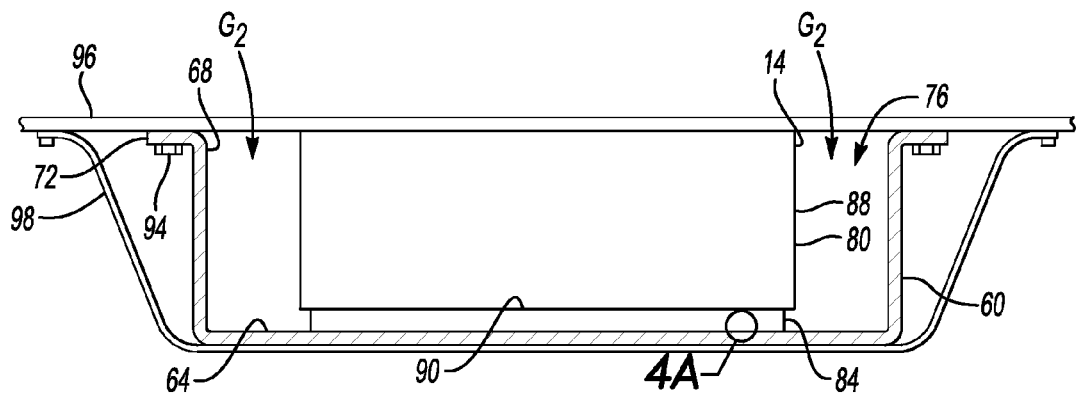
FIG. 4 illustrates a section view of the shield of FIG. 5 in an installed position with the battery pack and the vehicle frame.
Figure 4A:
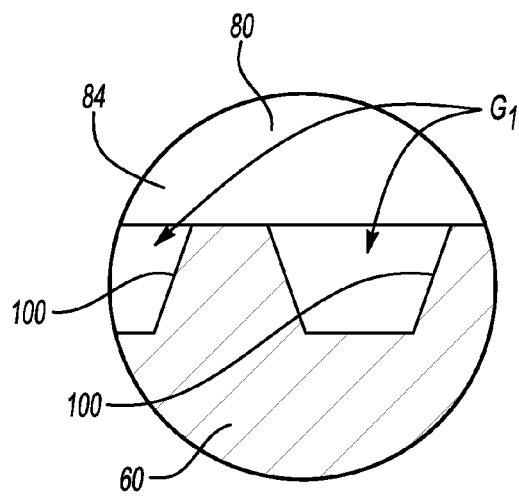
FIG. 4A illustrates a close-up view of area A in FIG. 4.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Referring now to FIGS. 2-4A with continuing reference to FIG. 1, a shield 60 is used in connection with the battery pack 14. The shield 60 is a barrier to electromagnetic frequencies and thermal energy. The shield 60 is a metal or metal alloy. The shield 60 can be aluminum, for example.

In an exemplary non-limiting embodiment, the shield 60 includes a floor 64 and a plurality of walls 68 extending transversely from the floor 64 to a flange 72. The shield 60 provides a cavity 76 that receives the battery pack 14. The floor 64 and flange 72 are generally parallel. The walls 68 generally extend perpendicularly from the floor 64 to the flange 72.

The battery pack 14 includes an enclosure 80. The battery arrays 18 are received within the enclosure 80. The enclosure 80 is a polymer-based material in this example. In some examples, the enclosure 80 is an injection molded thermoplastic material, such as a high-density polyethylene.

Since the battery pack 14 is used to selectively power propulsion of the HEV, the battery pack 14 is a traction battery pack. Other batteries of the HEV, such as a 12-volt accessory battery, would not be considered a traction battery pack since they are not used to power propulsion of the HEV.

The enclosure 80 of the battery pack 14 includes a tray 84 and a cover 88 secured to each other at a seam 90 using, for example, an infrared welding process. The tray 84 interfaces directly with the cover 88 at the seam 90. Securing the tray 84 to the cover 88 encloses the battery array 18 within the enclosure 80.

The flange 72 provides apertures 92 that each receive a mechanical fastener 94. During installation, the mechanical fasteners 94 are positioned within a respective one of the apertures 92 and torqued down to hold the flange 72 relative to a vehicle frame 96. The apertures 92 could be slotted to account for piece to piece variations during assembly.

The vehicle frame 96 is part of the chassis for the HEV and is considered an underbody of the HEV. The battery pack 14 and shield 60 are thus secured to an underbody of the HEV.

The mechanical fasteners 94 directly connect the shield 60 to the vehicle frame 96 and provide one or more electrical grounding paths between the shield 60 and the vehicle frame 96.

In the installed position, the battery pack 14 rests upon the floor 64 of the shield 60. The battery pack 14 could be secured to the floor 64 with mechanical fasteners, for example. Some shields, if appropriately structured and reinforced, could be used to support the battery pack 14.

The exemplary shield 60, however, does not support the full weight of the battery pack 14. Instead, a strap 98 extends below the floor 64 of the shield 60 to support the battery pack 14 and the shield 60. Opposing end portions of the strap 98 are directly connected to the vehicle frame 96.

The strap 98 can exert a clamping force on the shield 60 and the battery pack 14. The clamping force biases the floor 64 toward the tray 84 of the enclosure 80 and biases the cover 88 of the enclosure 80 toward the vehicle frame 96.

In another example, a strap supports the battery pack 14, but not the shield 60. In such an example, the strap could first secure the battery pack 14 to the vehicle frame 96. The shield 60 could then be positioned over the strap and the battery pack 14 such that both the strap and the battery pack 14 are received within the cavity 76.

The flange 72 nests tightly against the vehicle frame 96 to reduce air gaps between the shield 60 and the vehicle frame 96, which can block air paths to and from the cavity 76. The vehicle frame 96 acts as a cover for the cavity 76.

In another example, a separate, second shield is positioned between the vehicle frame 96 and the battery pack 14. Walls of the second shield overlap the walls 68 to provide a double walled shield assembly about a perimeter of the battery pack 14.

Thermal energy from outside the cavity 76 can be blocked by the shield 60 to reduce thermal energy levels at the enclosure 80. Thermal energy from outside the cavity 76 could be generated by other components or originate from other sources.

Notably, the cavity 76 is larger than the battery pack 14 so that, when the battery pack 14 is positioned within the cavity 76, there are gaps between at least some of the walls 68 and the battery pack 14. The gaps between the battery pack 14 and the walls 68 can further hinder thermal energy transferring to the battery pack 14.

The battery pack 14 contacts the shield 60 where transferring loads is desired, such as loads being transferred from the strap 98 through the floor 64 to the battery pack 14. Other areas of the battery pack 14 may contact the shield 60.

In an exemplary non-limiting embodiment, the shield 60 has surfaces formed with dimples 100 having a cross-sectional diameter that is from 2-4 millimeters. The dimples 100 in the shield 60 provide structure and act as stand-offs from the battery pack 14 where the battery pack 14 is in close proximity to the shield 60. Because the shield 60 contacts the battery pack 14 at the peaks of the dimples 100, there are air gaps $G_1$ between the battery pack 14 and dimples 100 of the shield 60. In other areas where there are not substantial space constraints, such as where the shield 60 is not required to contact the battery pack 14, the battery pack 14 can be spaced from the shield 60 to provide an air gap $G_2$ that is from 5-10 millimeters.

In the installed position, the walls 68 of the shield 60 extend from the floor 64, past the seam 90, to the flange 72. The walls 68, along with other areas of the shield 60, block some incoming and outgoing electromagnetic frequencies.

Notably, the interface between the vehicle frame 96 and flange 72 is vertically offset from the seam 90 of the enclosure 80. Particularly in embodiments where the enclosure 80 is a metal or metal alloy, the offset inhibits movements of electromagnetic frequencies through the seam 90 to outside the cavity 76, and vice versa. Since the seam 90 and interface between the vehicle frame 96 and flange 72 are misaligned, there is no direct linear path between the seam 90 and an area outside the cavity 76.

Figure 5:
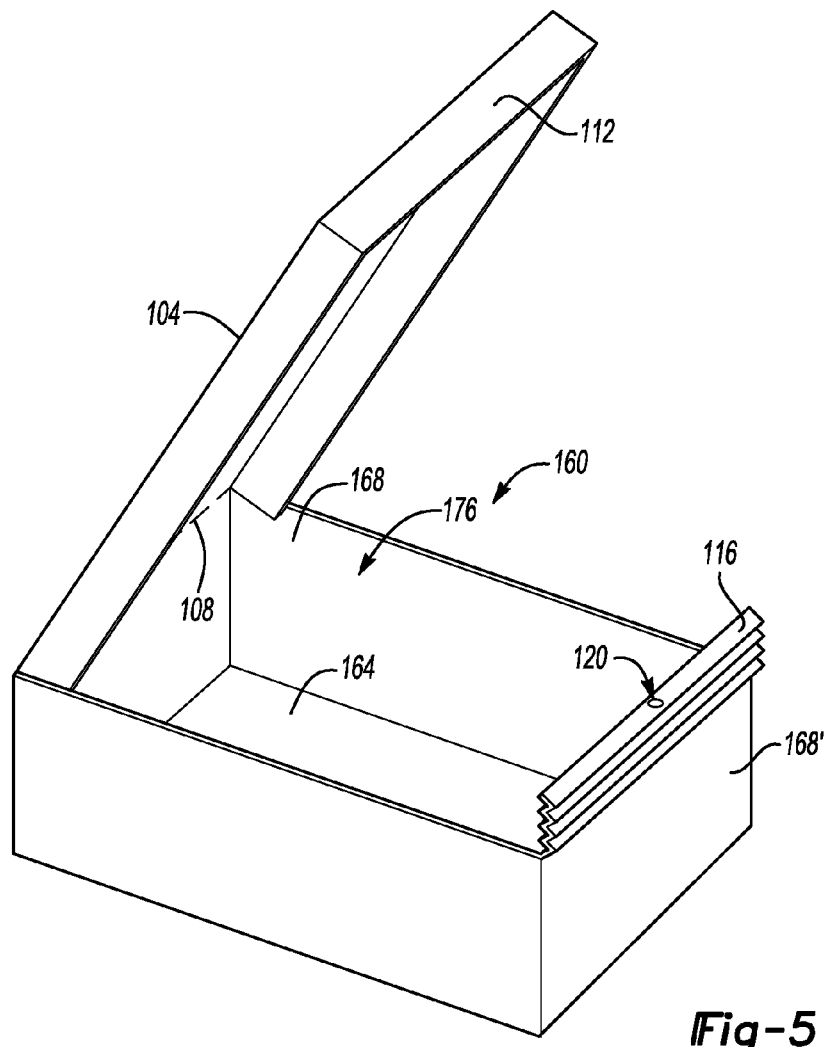
FIG. 5 illustrates a perspective view of a shield for the battery pack in FIG. 1 according to another exemplary embodiment of this disclosure.
Figure 6:
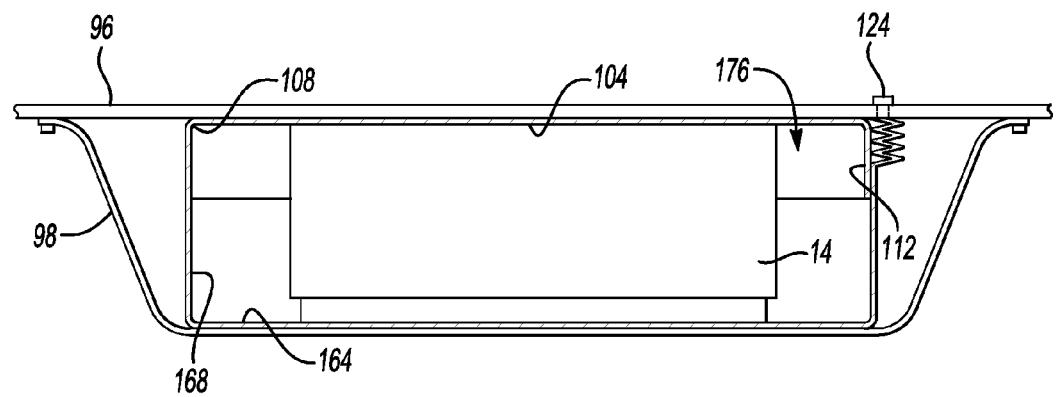
FIG. 6 illustrates a section view of the shield of FIG. 5 in an installed position with the battery pack and the vehicle frame.

Referring now to FIGS. 5 and 6, a shield 160, according to another exemplary embodiment of the present disclosure, includes a floor 164, a plurality of walls 168, and a cover 104. The walls 168 extend transversely from the floor 164.

The cover 104 is attached to one of the walls 168 via a living hinge 108. The cover 104 extends from the living hinge 108. On the sides of the cover 104 that do not connect to the living hinge 108, the cover 104 includes a flange 112 extending transversely from the cover 104. The cover 104 can move from the position of FIG. 5 to the position of FIG. 6 to enclose a cavity 176 of the shield 160.

An isolator 116 is located on one of the walls 168'. In this example, the wall 168' is opposite the wall 168 with the living hinge 108.

In a non-limiting embodiment, the isolator 116 is a corrugated section of the wall 168'. The corrugated section can be formed in the wall 168' by crimping a portion of the wall 168' to form one or more corrugations or waves in the wall 168'. The isolator 116 is provided entirely by the shield 160 in this example. In another example, a separate structure could provide some or all of the isolator 116.

The isolator 116 includes an aperture 120. When the shield 160 is in the installed position of FIG. 6, a mechanical fastener 124 extends from the vehicle frame 96 through the aperture 120. The mechanical fastener 124 could be a bolt or threaded stud extending from the vehicle frame 96, but may also be a weld nut on the vehicle frame 96 and a threaded fastener secured from underneath. In this example, an uppermost flange of the isolator 116 includes the aperture 120 permitting the securing of the isolator 116 to the vehicle frame 96 and the electrical grounding of the shield 160 to the vehicle frame 96. When the shield 160 is in the installed position, the flange 112 extends past the isolator 116 into the cavity 76 to provide additional shielding near an interface between the isolator 116 and the vehicle frame 96.

Securing the strap 98 clamps the shield 160 and the battery pack 14 between the strap 98 and the vehicle frame 96. Clamping the shield 160 toward the vehicle frame 96 compresses the isolator 116. Other than the mechanical fastener 124 secured to the isolator 116 for grounding purposes, the shield 160 is not rigidly secured to the vehicle frame 96.

Loads, such as vibratory loads, from the vehicle frame 96 can induce relative movement between the vehicle frame 96 and the shield 160. The isolator 116 flexes and bends to accommodate some relative movement of the shield 160 relative to the vehicle frame 96. The relative movement is thus less likely to damage the shield 160. Essentially, the isolator 116 helps to isolate the shield 160 from relative movements of the vehicle frame 96.

Notably, the isolator 116 is located where the shield 160 is connected directly to the vehicle frame 96 via the mechanical fastener 124. Because of the direct connection, this area could be particularly prone to damage if the vehicle frame 96 is moved relative to the shield 160. In this embodiment, isolators are not used in other areas of the shield 160 since there are no direct connections between the vehicle frame 96 and the shield 160 in those areas.

In another exemplary embodiment, the shield 160 could include the cover 104, but not the isolator 116 and direct connection via the mechanical fastener 124. A shield without the isolator 116 could be held against the vehicle frame 96 like the shield 160. A shield without the isolator 116 could grounded to the vehicle frame 96 utilizing a wire lead, such as a braided wire bolted to the vehicle frame 96 and the shield without the isolator 116. Further, in another non-limiting embodiment, the shield 160 could be welded or otherwise fastened to the straps 98 and grounded through the straps 98.

Figure 7:
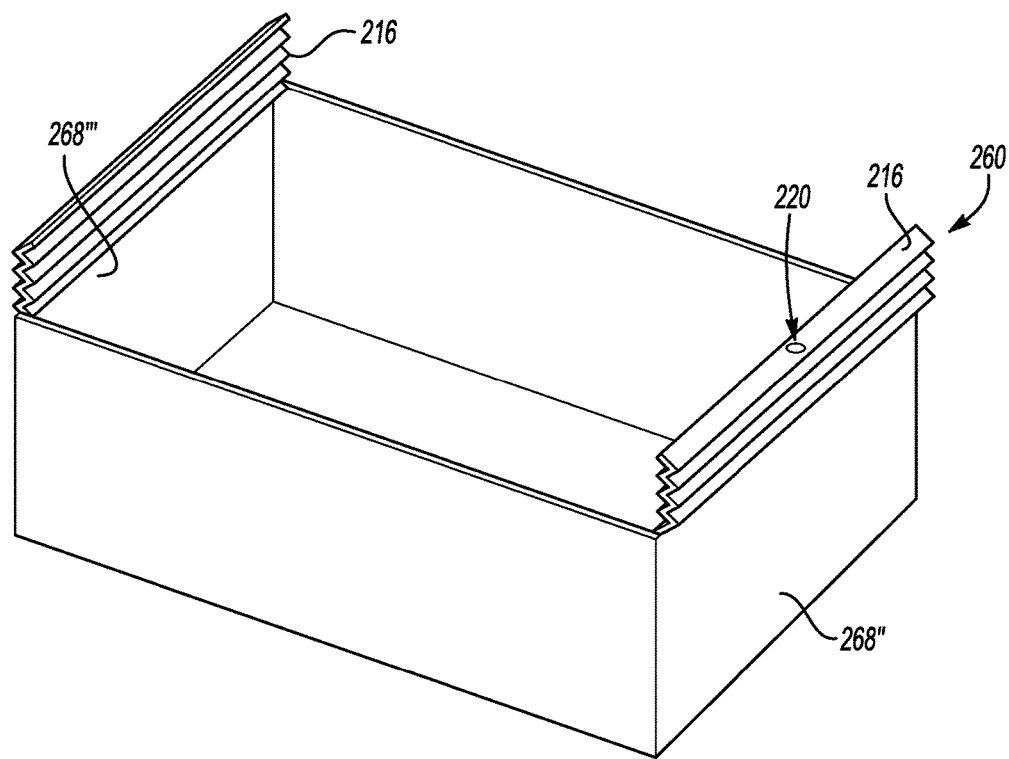
FIG. 7 illustrates a perspective view of a shield for the battery pack in FIG. 1 according to yet another exemplary embodiment of this disclosure.
Figure 8:
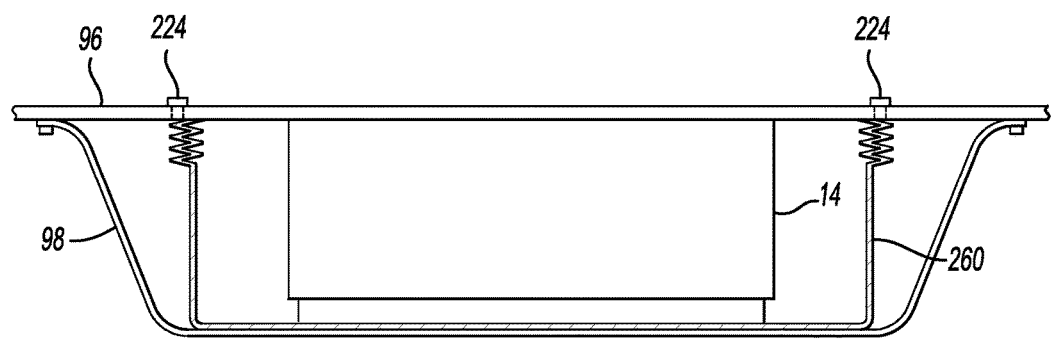
FIG. 8 illustrates a section view of the shield of FIG. 7 in an installed position with the battery pack and the vehicle frame.

Referring now to FIGS. 7 and 8, a shield 260 according to yet another exemplary embodiment of the present disclosure includes two isolators 216 extending from opposing end walls 268" of the shield 260. The shield 260 includes no cover. Instead, the vehicle frame 96 acts as a cover for the shield 260.

When the strap 98 secures the battery pack 14 and the shield 260 in the installed position, the isolators 216 are compressed against the vehicle frame 96.

The isolators 216 each include an aperture 220 in this example. Mechanical fasteners 224 electrically ground the isolators 216, and thus the shield 260, to the vehicle frame 96. The isolators 216 can flex and bend to accommodate movement of the vehicle frame 96 relative to the shield 260.

Features of the disclosed examples include a shield that provides thermal protection and an electromagnetic frequency barrier for a battery pack. The shield is particularly appropriate for use in connection with a polymer-based battery enclosure, which can be particularly sensitive to higher thermal energy levels and can include seams.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
   a traction battery pack having a polymer-based enclosure;
   a shield having a floor and a plurality of walls extending transversely away from the floor, the shield provides a cavity that receives a traction battery pack of an electrified vehicle, the cavity is larger than the traction battery pack so that there is a gap between at least some of the plurality of walls and the traction battery pack within the cavity,
   the battery pack supported on the floor of the shield and biased toward a vehicle frame, the walls extending transversely from the floor to the vehicle frame;
   a vehicle frame spanning over the cavity from a first one of the plurality of walls to an opposite, second one of the plurality of walls, wherein the shield is electrically grounded to the vehicle frame; and
   an isolator of the shield that isolates loads moving from the vehicle frame to the shield, wherein the isolator is a corrugated portion of the shield, and the shield with the corrugated portion is a metal or metal alloy.

2. The battery assembly of claim 1, further comprising a cover of the shield directly attached to at least one of the plurality of walls and moveable to a position that covers the cavity.

3. The battery assembly of claim 2, further comprising a living hinge attaching the cover to the at least one of the plurality of walls.

4. The battery assembly of claim 1, wherein the shield is secured directly to the vehicle frame.

5. The battery assembly of claim 1, wherein the shield is secured to the vehicle frame through the isolator.

6. The battery assembly of claim 1, wherein the shield includes an aluminum material, and the shield provides thermal energy and electromagnetic shielding for the battery pack.

7. A battery pack shielding method, comprising:
   securing a shield to a vehicle frame to enclose a traction battery pack held within a cavity of the shield; and
   pressing a floor of the shield against the battery pack to compress the battery pack during the securing; and
   covering the battery pack with a cover of the shield that is separate from the vehicle frame, the cover secured to a wall of the shield using a living hinge.

8. The battery pack shielding method of claim 7, further comprising grounding the shield to the vehicle frame.

9. The battery pack shielding method of claim 7, wherein the battery pack includes a polymer-based enclosure, and the shield includes a metal or metal alloy material providing thermal and electromagnetic shielding.

10. The battery pack shielding method of claim 7, wherein the wall is one of a plurality of walls extending transversely away from the floor, the battery pack held in the cavity such that the battery pack is spaced a distance from the plurality of walls to provide a gap between the plurality of walls and the shield.

11. A battery pack shielding method, comprising:
    securing a shield to a vehicle frame to enclose a traction battery pack held within a cavity of the shield;
    pressing a floor of the shield against the battery pack to compress the battery pack during the securing; and
    isolating loads sent from the vehicle frame to the battery pack using an isolator of the shield, wherein the isolator comprises a corrugated portion of the shield, and the corrugated portion is a metal or metal alloy.

12. The battery pack shielding method of claim 11, further comprising crimping a portion of the shield to provide the corrugated portion.

13. A battery assembly, comprising:
    a shield having a floor and a plurality of walls extending transversely away from the floor, the shield provides a cavity that receives a traction battery pack of an electrified vehicle, the cavity is larger than the traction battery pack so that there is a gap between at least some of the plurality of walls and the traction battery pack within the cavity; and
    a vehicle frame extending from a first one of the plurality of walls to an opposing, second one of the plurality of walls to cover the cavity,
    wherein the shield interfaces with the vehicle frame through a flange, and an interface between the vehicle frame and the flange is vertically offset from a seam of the enclosure, the seam where a tray of the enclosure interfaces directly with a cover of the enclosure.

* * * * *